(12) United States Patent
Evers et al.

(10) Patent No.: US 11,966,373 B2
(45) Date of Patent: Apr. 23, 2024

(54) SYSTEM AND METHOD DATA QUALITY VALIDATION FOR MIGRATING SERVICING LAYER IMPLEMENTATIONS

(71) Applicant: JPMorgan Chase Bank, N.A., New York, NY (US)

(72) Inventors: Maxwell Evers, Wilmington, DE (US); Prakash Ravi, Bear, DE (US); Amit Kumar Meshram, Romansville, PA (US); Indrajit Biswas, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 18 days.

(21) Appl. No.: 17/903,628

(22) Filed: Sep. 6, 2022

(65) Prior Publication Data

US 2024/0078216 A1  Mar. 7, 2024

(51) Int. Cl.
| | | |
|---|---|---|
| *G06F 16/00* | (2019.01) | |
| *G06F 16/21* | (2019.01) | |
| *G06F 16/215* | (2019.01) | |
| *G06F 16/23* | (2019.01) | |
| *G06F 16/27* | (2019.01) | |

(52) U.S. Cl.
CPC ......... *G06F 16/215* (2019.01); *G06F 16/214* (2019.01); *G06F 16/2365* (2019.01); *G06F 16/27* (2019.01)

(58) Field of Classification Search
CPC .. G06F 16/215; G06F 16/214; G06F 16/2365; G06F 16/27

USPC ........................................................ 707/690
See application file for complete search history.

(56) References Cited

U.S. PATENT DOCUMENTS

| | | | | |
|---|---|---|---|---|
| 10,164,990 | B2 * | 12/2018 | Jaganmohan | H04L 63/1408 |
| 11,042,529 | B2 * | 6/2021 | Nguyen | G06F 16/219 |
| 2005/0050054 | A1 * | 3/2005 | Clark | G06F 16/27 |
| 2019/0057137 | A1 * | 2/2019 | Bradham | G16H 10/20 |
| 2019/0138626 | A1 * | 5/2019 | Nguyen | G06F 16/2365 |
| 2019/0163348 | A1 * | 5/2019 | Prakash | G06F 16/532 |

* cited by examiner

*Primary Examiner* — Incent F Boccio
(74) *Attorney, Agent, or Firm* — GREENBLUM & BERNSTEIN, P.L.C.

(57) ABSTRACT

Various methods, apparatuses/systems, and media for data migration readiness of a target data source are disclosed. A processor receives a request having configurable filters and parameters from a consumer service to obtain data; invokes, in response to receiving the request, a service application programming interface (API) for the data; fetches requested data from a legacy data source in response to calling the service API; fetches data corresponding to the same request having the same configurable filters and parameters from a target data source; compare the fetched data from the legacy data source to the fetched data from the target data source; generates, in response to comparing, a data quality validation score; and when it is determined that the data quality validation score is equal to or more that predetermined threshold value, validates the target data source for migration readiness and terminating the legacy data source.

17 Claims, 6 Drawing Sheets

SYSTEM AND METHOD DATA QUALITY VALIDATION FOR MIGRATING SERVICING LAYER IMPLEMENTATIONS

TECHNICAL FIELD

This disclosure generally relates to data processing, and, more particularly, to methods and apparatuses for implementing a platform and language agnostic data quality validation module configured to migrate servicing layer implementations with a degree of confidence in the accuracy of the data provided.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. In general, large enterprises, corporations, agencies, institutions, and other organizations are facing a continuing problem of handling, processing, and/or accurately describing a vast amount of data that are crucial to plan actions at store level or market/regional level in an efficient and expedited manner.

For example, there may be several services that are implementing consumed data from systems of record (SOR), the origination of where this data comes from. There might be another process, i.e., parallel to this SOR process that may need to host and manage this data. Typically, there are two different sources, an old legacy source and a new source (i.e., a destination of the data migration). Conventional tools fail to provide a process that may compare the values of these two sources (i.e., the legacy source and the new source) to ensure that the data consumed from the legacy source is identical to the data that may be consumed from the new source. Thus, the conventional tools fail to ensure a degree of confidence in the accuracy of the data provided in the new source.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic data quality validation module configured to migrate servicing layer implementations with a degree of confidence in the accuracy of the data provided, but the disclosure is not limited thereto.

According to an aspect of the present disclosure, a method for data quality validation by utilizing one or more processors along with allocated memory is disclosed. The method may include: receiving a request having configurable filters and parameters from a consumer service to obtain data; invoking, in response to receiving the request, a service application programming interface (API) for the data; fetching requested data from a legacy data source in response to calling the service API; fetching data corresponding to the same request having the same configurable filters and parameters from a target data source; comparing the fetched data from the legacy data source to the fetched data from the target data source; generating, in response to comparing, a data quality validation score; and when it is determined that the data quality validation score is equal to or more that predetermined threshold value, validating the target data source for migration readiness and terminating the legacy data source.

According to a further aspect of the present disclosure, during processing of the received request, a system of record (SOR) payload that is returned from the legacy data source as the requested data in response to calling the service API may include an asynchronously fetched copy of a new utility layer's version of the payload that is returned from the target data source as the fetched data corresponding to the same request having the same configurable filters and parameters in response to calling the same service API.

According to another aspect of the present disclosure, the method may further include: pairing the SOR payload and the new utility layer's version of the payload to a messaging platform for consuming by a microservice; comparing, by the microservice, the SOR payload with the new utility layer's version of the payload; and generating, in response to comparing, the data quality validation score.

According to yet another aspect of the present disclosure, the method may further include: publishing results generated from the comparing process to a data store when it is determined that there is a discrepancy between the SOR payload and the new utility layer's version of the payload.

According to an aspect of the present disclosure, the method may further include: exposing the data store through analytical tools for reporting and alerting on varying severities of mismatches associated with the discrepancy between the SOR payload and the new utility layer's version of the payload.

According to a further aspect of the present disclosure, the method may further include: reconciling the mismatches prior to validating that the target data source is migration ready to perform as a service provider for the consumer service; and terminating the legacy data source as the service provider.

According to another aspect of the present disclosure, in comparing process, the method may further include: performing filed level comparison between the fetched data from the legacy data source and the fetched data from the target data source.

According to an aspect of the present disclosure, a system for data quality validation is disclosed. The system may include: a processor; and a memory operatively connected to the processor via a communication interface, the memory storing computer readable instructions, when executed, may cause the processor to: receive a request having configurable filters and parameters from a consumer service to obtain data; invoke, in response to receiving the request, a service API for the data; fetch requested data from a legacy data source in response to calling the service API; fetch data corresponding to the same request having the same configurable filters and parameters from a target data source; compare the fetched data from the legacy data source to the fetched data from the target data source; generate, in response to comparing, a data quality validation score; and when it is determined that the data quality validation score is equal to or more that predetermined threshold value, validate the target data source for migration readiness and terminating the legacy data source.

According to another aspect of the present disclosure, the processor is further configured to: pair the SOR payload and the new utility layer's version of the payload to a messaging platform for consuming by a microservice; compare, by the microservice, the SOR payload with the new utility layer's version of the payload; and generate, in response to comparing, the data quality validation score.

According to yet another aspect of the present disclosure, the processor is further configured to: publish results generated from the comparing process to a data store when it is determined that there is a discrepancy between the SOR payload and the new utility layer's version of the payload.

According to an aspect of the present disclosure, the processor is further configured to: expose the data store through analytical tools for reporting and alerting on varying severities of mismatches associated with the discrepancy between the SOR payload and the new utility layer's version of the payload.

According to a further aspect of the present disclosure, the processor is further configured to: reconcile the mismatches prior to validating that the target data source is migration ready to perform as a service provider for the consumer service; and terminate the legacy data source as the service provider.

According to another aspect of the present disclosure, in comparing process, the processor is further configured to: perform field level comparison between the fetched data from the legacy data source and the fetched data from the target data source.

According to an aspect of the present disclosure, a non-transitory computer readable medium configured to store instructions for data quality validation is disclosed. The instructions, when executed, may cause a processor to perform the following: receiving a request having configurable filters and parameters from a consumer service to obtain data; invoking, in response to receiving the request, a service API for the data; fetching requested data from a legacy data source in response to calling the service API; fetching data corresponding to the same request having the same configurable filters and parameters from a target data source; comparing the fetched data from the legacy data source to the fetched data from the target data source; generating, in response to comparing, a data quality validation score; and when it is determined that the data quality validation score is equal to or more that predetermined threshold value, validating the target data source for migration readiness and terminating the legacy data source.

According to another aspect of the present disclosure, the instructions, when executed, may cause the processor to further perform the following: pairing the SOR payload and the new utility layer's version of the payload to a messaging platform for consuming by a microservice; comparing, by the microservice, the SOR payload with the new utility layer's version of the payload; and generating, in response to comparing, the data quality validation score.

According to yet another aspect of the present disclosure, the instructions, when executed, may cause the processor to further perform the following: publishing results generated from the comparing process to a data store when it is determined that there is a discrepancy between the SOR payload and the new utility layer's version of the payload.

According to an aspect of the present disclosure, the instructions, when executed, may cause the processor to further perform the following: exposing the data store through analytical tools for reporting and alerting on varying severities of mismatches associated with the discrepancy between the SOR payload and the new utility layer's version of the payload.

According to a further aspect of the present disclosure, the instructions, when executed, may cause the processor to further perform the following: reconciling the mismatches prior to validating that the target data source is migration ready to perform as a service provider for the consumer service; and terminating the legacy data source as the service provider.

According to another aspect of the present disclosure, in comparing process, the instructions, when executed, may cause the processor to further perform the following: performing field level comparison between the fetched data from the legacy data source and the fetched data from the target data source.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
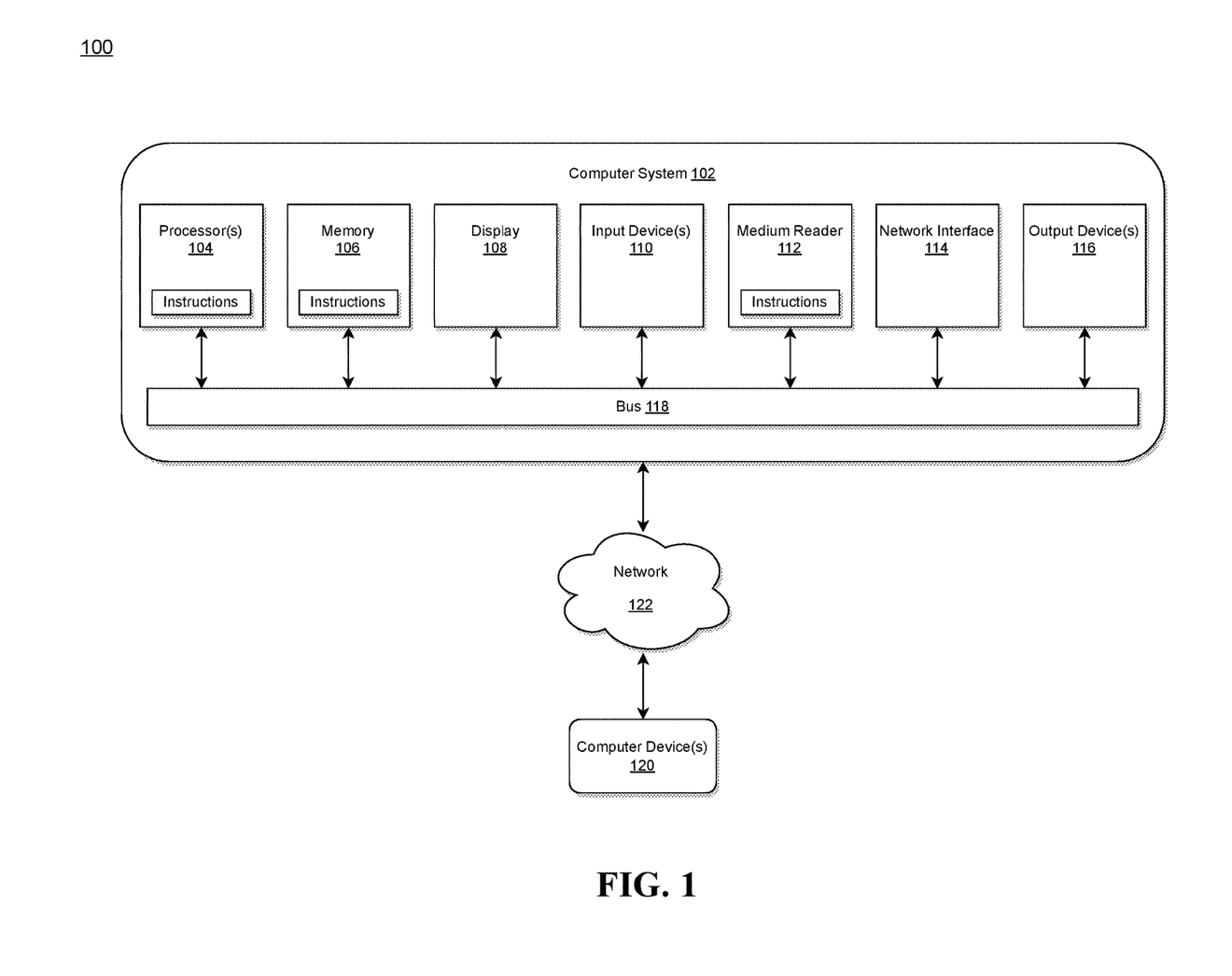
FIG. 1 illustrates a computer system for implementing a platform and language agnostic data quality validation module configured to migrate servicing layer implementations with a degree of confidence in the accuracy of the data provided in accordance with an exemplary embodiment.

FIG. 1 is an exemplary system for implementing a platform and language agnostic data quality validation module configured to migrate servicing layer implementations with a degree of confidence in the accuracy of the data provided in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionalities as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration-based languages.

Figure 2:
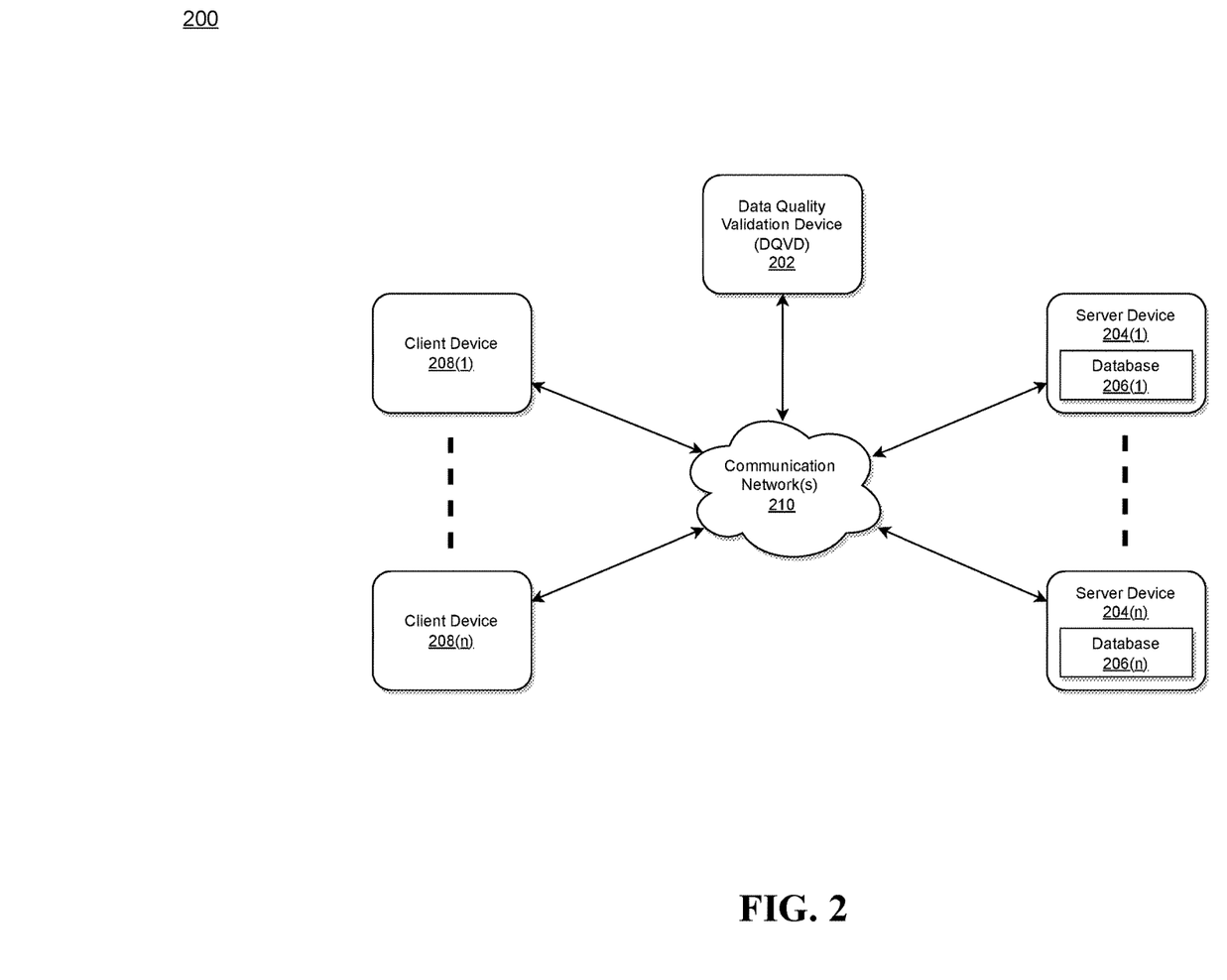
FIG. 2 illustrates an exemplary diagram of a network environment with a platform and language data quality validation device in accordance with an exemplary embodiment.

Referring to FIG. 2, a schematic of an exemplary network environment 200 for implementing a platform and language agnostic data quality validation device (DQVD) of the instant disclosure is illustrated.

According to exemplary embodiments, the above-described problems associated with conventional approach of data migration may be overcome by implementing a platform and language agnostic DQVD 202 as illustrated in FIG. 2 that may implement a platform and language agnostic data quality validation module (DQVM) configured to migrate servicing layer implementations with a degree of confidence in the accuracy of the data provided, but the disclosure is not limited thereto. For example, it is desirable to migrate servicing layer to providing data directly from the SOR to providing data from the new transaction utility layer. Before one is comfortable onboarding service consumers to the new utility layer, it may be necessary to be able to provide a degree of confidence in the accuracy of the data provided. Thus, according to exemplary embodiments, during the processing of a request implemented by the DQVD 202, the SOR payload that was returned would have an asynchronously fetched copy of the new utility layer's version of the payload. These payloads are then published to a messaging platform (i.e., Kafka) topic and consumed by another microservice. This downstream consumer would compare the SOR versus the utility payload and if there were any discrepancies, the results are published to another data store. This data store could be exposed through analytical tools, e.g., Tableau for reporting and alerting on varying severities of mismatches.

The DQVD 202 may be the same or similar to the computer system 102 as described with respect to FIG. 1.

The DQVD 202 may store one or more applications that can include executable instructions that, when executed by the DQVD 202, cause the DQVD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DQVD 202 itself, may be located in virtual server(s) running in a cloud-based computing environment rather than being tied to one or more specific physical network computing devices. Also, the application(s) may be running in one or more virtual machines (VMs) executing on the DQVD 202. Additionally, in one or more embodiments of this technology, virtual machine(s) running on the DQVD 202 may be managed or supervised by a hypervisor.

In the network environment 200 of FIG. 2, the DQVD 202 is coupled to a plurality of server devices 204(1)-204(n) that hosts a plurality of databases 206(1)-206(n), and also to a plurality of client devices 208(1)-208(n) via communication network(s) 210. A communication interface of the DQVD 202, such as the network interface 114 of the computer system 102 of FIG. 1, operatively couples and communicates between the DQVD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DQVD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DQVD 202 may be a standalone device or integrated with one or more other devices or apparatuses, such as one or more of the server devices 204(1)-204(n), for example. In one particular example, the DQVD 202 may be hosted by one of the server devices 204(1)-204(n), and other arrangements are also possible. Moreover, one or more of the devices of the DQVD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DQVD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DQVD 202 that may efficiently provide a platform for implementing a platform and language agnostic data quality validation module configured to migrate servicing layer implementations with a degree of confidence in the accuracy of the data provided, but the disclosure is not limited thereto.

The client devices 208(1)-208(n) may run interface applications, such as standard web browsers or standalone client applications, which may provide an interface to communicate with the DQVD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DQVD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DQVD 202, the server devices 204(1)-204(n), or the client devices 208(1)-208(n), for example, may be configured to operate as virtual instances on the same physical machine. For example, one or more of the DQVD 202, the server devices 204(1)-204(n), or the client devices 208(1)-208(n) may operate on the same physical device rather than as separate devices communicating through communication network(s) 210. Additionally, there may be more or fewer DQVDs 202, server devices 204(1)-204(n), or client devices 208(1)-208(n) than illustrated in FIG. 2. According to exemplary embodiments, the DQVD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
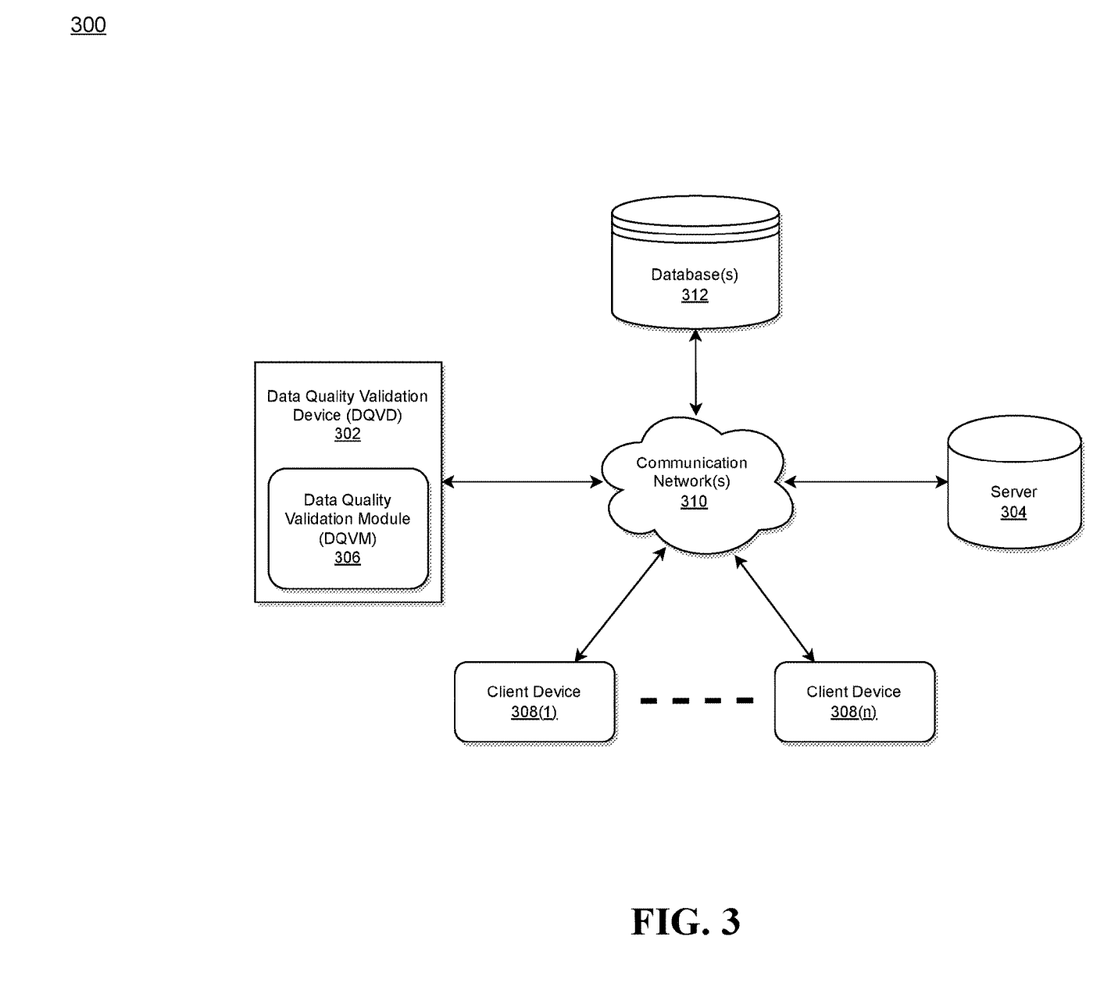
FIG. 3 illustrates a system diagram for implementing a platform and language agnostic data quality validation device having a platform and language agnostic data quality validation module in accordance with an exemplary embodiment.

FIG. 3 illustrates a system diagram for implementing a platform and language agnostic DQVD having a platform and language agnostic DQVM in accordance with an exemplary embodiment.

As illustrated in FIG. 3, the system 300 may include an DQVD 302 within which an DQVM 306 is embedded, a server 304, a database(s) 312, a plurality of client devices 308(1) . . . 308(n), and a communication network 310.

According to exemplary embodiments, the DQVD 302 including the DQVM 306 may be connected to the server 304, and the database(s) 312 via the communication network 310. The DQVD 302 may also be connected to the plurality of client devices 308(1) . . . 308(n) via the communication network 310, but the disclosure is not limited thereto.

According to exemplary embodiment, the DQVD 302 is described and shown in FIG. 3 as including the DQVM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may produce programming for searching, monitoring, and analyzing machine-generated data via a Web-style interface, etc., but the disclosure is not limited thereto.

According to exemplary embodiments, the DQVM 306 may be configured to receive real-time feed of data from the plurality of client devices 308(1) . . . 308(n) via the communication network 310.

As will be described below, the DQVM 306 may be configured to receive a request having configurable filters and parameters from a consumer service to obtain data; invoke, in response to receiving the request, a service application programming interface (API) for the data; fetch requested data from a legacy data source in response to calling the service API; fetch data corresponding to the same request having the same configurable filters and parameters from a target data source; compare the fetched data from the legacy data source to the fetched data from the target data source; generate, in response to comparing, a data quality validation score; and when it is determined that the data quality validation score is equal to or more that predetermined threshold value, validate the target data source for migration readiness and terminating the legacy data source, but the disclosure is not limited thereto.

The plurality of client devices 308(1) . . . 308(n) are illustrated as being in communication with the DQVD 302. In this regard, the plurality of client devices 308(1) . . . 308(n) may be "clients" of the DQVD 302 and are described herein as such. Nevertheless, it is to be known and understood that the plurality of client devices 308(1) . . . 308(n) need not necessarily be "clients" of the DQVD 302, or any entity described in association therewith herein. Any additional or alternative relationship may exist between either or both of the plurality of client devices 308(1) . . . 308(n) and the DQVD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DQVD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DQVD 302 may be the same or similar to the DQVD 202 as described with respect to FIG. 2, including any features or combination of features described with respect thereto.

Figure 4:
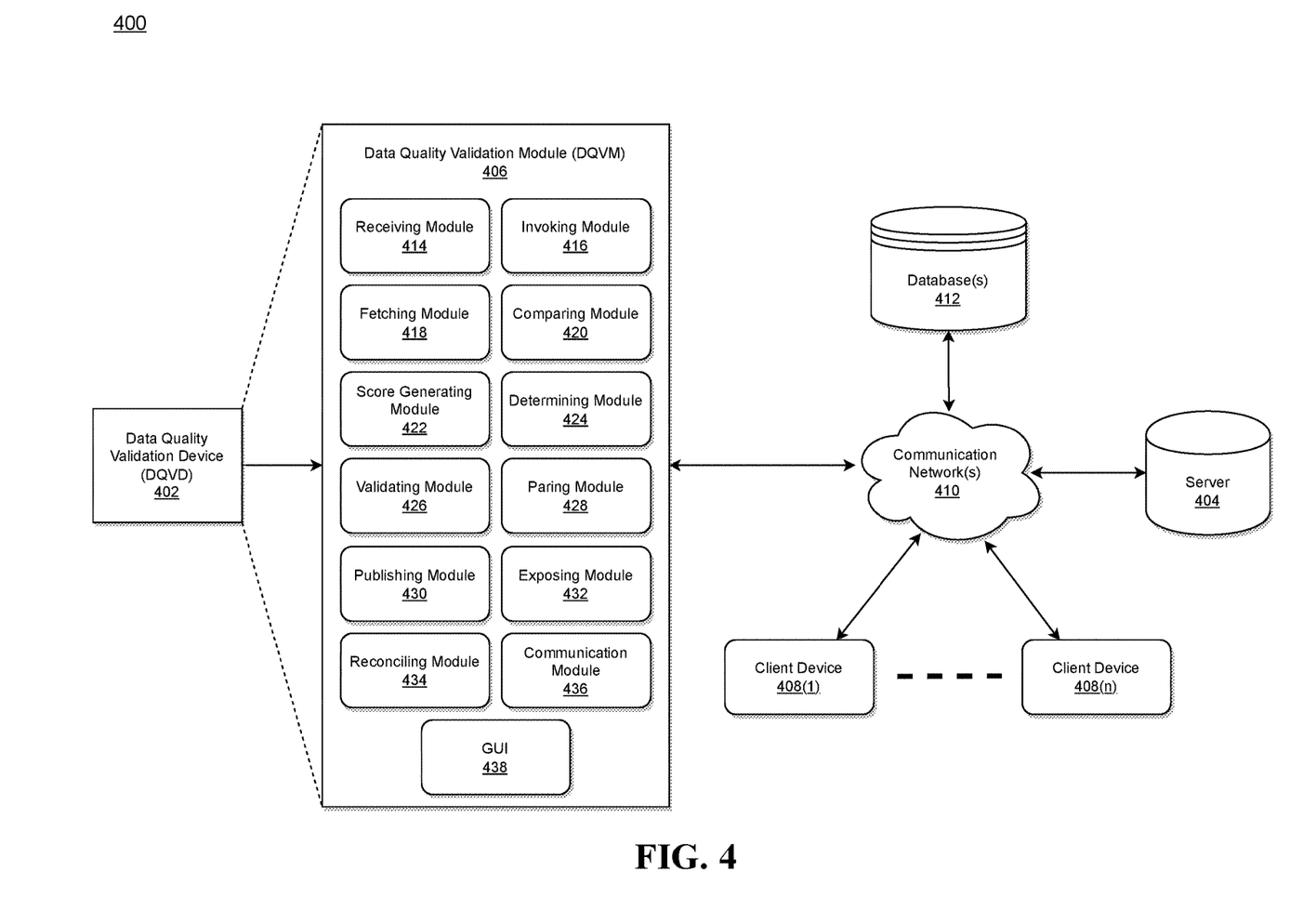
FIG. 4 illustrates a system diagram for implementing a platform and language agnostic data quality validation module of FIG. 3 in accordance with an exemplary embodiment.

FIG. 4 illustrates a system diagram for implementing a platform and language agnostic DQVM of FIG. 3 in accordance with an exemplary embodiment.

According to exemplary embodiments, the system 400 may include a platform and language agnostic DQVD 402 within which a platform and language agnostic DQVM 406 is embedded, a server 404, database(s) 412, and a communication network 410.

According to exemplary embodiments, the DQVD 402 including the DQVM 406 may be connected to the server 404 and the database(s) 412 via the communication network 410. The DQVD 402 may also be connected to the plurality of client devices 408(1)-408(n) via the communication network 410, but the disclosure is not limited thereto. The DQVM 406, the server 404, the plurality of client devices 408(1)-408(n), the database(s) 412, the communication network 410 as illustrated in FIG. 4 may be the same or similar to the DQVM 306, the server 304, the plurality of client devices 308(1)-308(n), the database(s) 312, the communication network 310, respectively, as illustrated in FIG. 3.

According to exemplary embodiments, as illustrated in FIG. 4, the DQVM 406 may include a receiving module 414, an invoking module 416, a fetching module 418, a comparing module 420, a score generating module 422, a determining module 424, a validating module 426, a pairing module 428, a publishing module 430, an exposing module 432, a reconciling module 434, a communication module 436, and a graphical user interface (GUI) 438. According to exemplary embodiments, interactions and data exchange among these modules included in the DQVM 406 provide the advantageous effects of the disclosed invention. Functionalities of each module of FIG. 4 will be described in detail below with reference to FIG. 5.

According to exemplary embodiments, each of the receiving module 414, invoking module 416, fetching module 418, comparing module 420, score generating module 422, determining module 424, validating module 426, pairing module 428, publishing module 430, exposing module 432, reconciling module 434, and the communication module 436 of the DQVM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, invoking module 416, fetching module 418, comparing module 420, score generating module 422, determining module 424, validating module 426, pairing module 428, publishing module 430, exposing module 432, reconciling module 434, and the communication module 436 of the DQVM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, invoking module 416, fetching module 418, comparing module 420, score generating module 422, determining module 424, validating module 426, pairing module 428, publishing module 430, exposing module 432, reconciling module 434, and the communication module 436 of the DQVM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, invoking module 416, fetching module 418, comparing module 420, score generating module 422, determining module 424, validating module 426, pairing module 428, publishing module 430, exposing module 432, reconciling module 434, and the communication module 436 of the DQVM 406 may be called via corresponding API.

The process may be executed via the communication module 436 and the communication network 410, which may comprise plural networks as described above. For example, in an exemplary embodiment, the various components of the DQVM 406 may communicate with the server 404 and the database(s) 412 via the communication module 436 and the communication network 410. Of course, these embodiments are merely exemplary and are not limiting or exhaustive.

According to exemplary embodiments, the communication network 410 and the communication module 436 may be configured to establish a link between the database(s) 412, the client devices 408(1)-408(n) and the DQVM 406.

Figure 5:
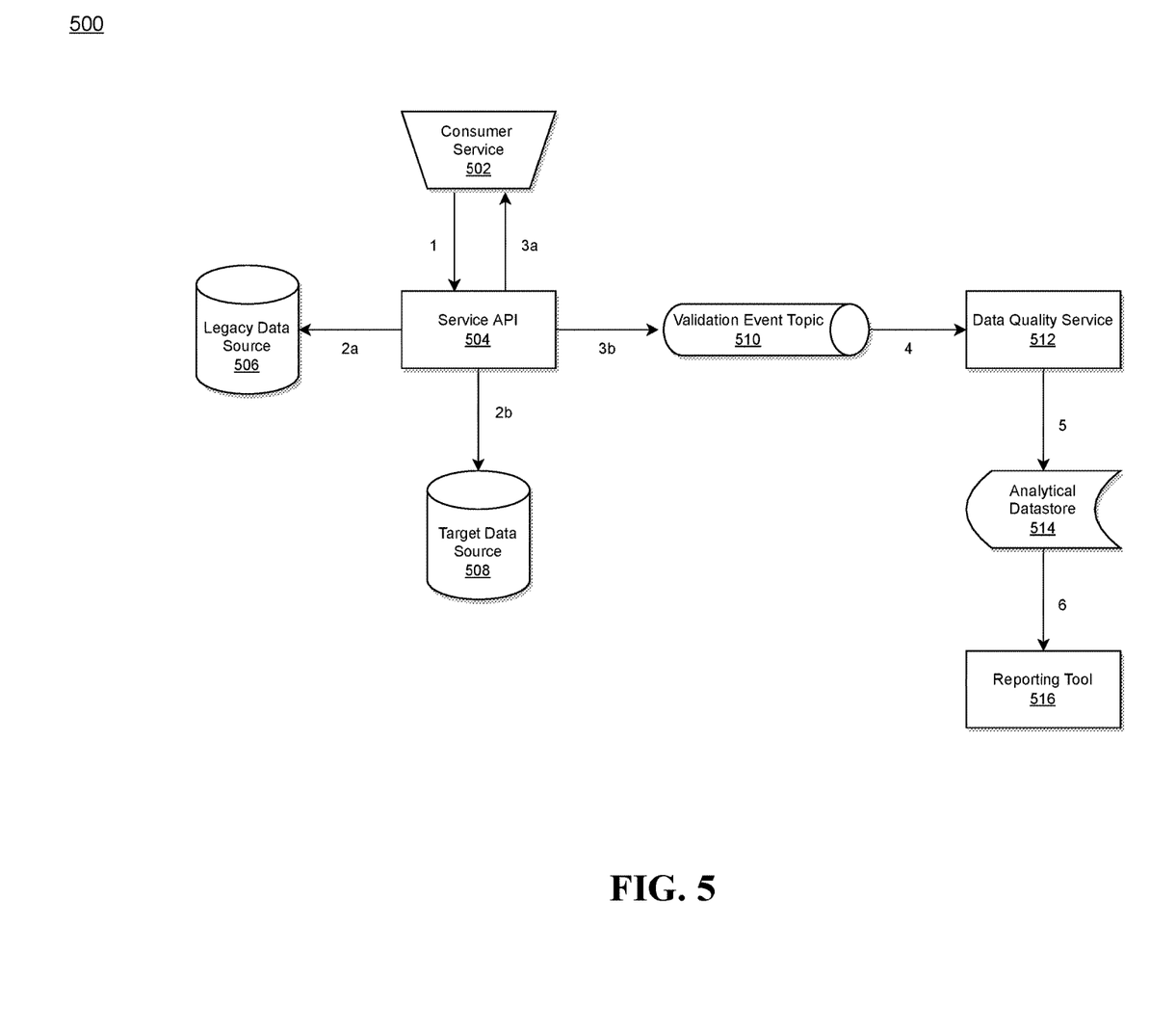
FIG. 5 illustrates an exemplary architecture implemented by the platform and language agnostic data quality validation module of FIG. 4 in accordance with an exemplary embodiment.

FIG. 5 illustrates an exemplary architecture 500 implemented by the platform and language agnostic DQVM 406 of FIG. 4 in accordance with an exemplary embodiment. As illustrated in FIG. 5, the exemplary architecture 500 may include a consumer service 502, service API 504, a legacy data source 506, a target data source 508, a validation event topic 510, a data quality service 512, an analytical datastore 514, and a reporting tool 516. The reporting tool 516 may include a GUI 438 as illustrated in FIG. 4.

According to exemplary embodiments, the architecture 500 implemented by the platform and language agnostic DQVM 406 of FIG. 4 may implement the following sequence flows, but the disclosure is not limited thereto. For example, in sequence 1, a consumer utilizing the consumer service 502 may invoke service API 504 for data; in sequence 2a, the service API 504 may fetch requested data from a current system of record (e.g., legacy data source 506); in sequence 2b, the service API 504 in parallel may fetch the same request with same filters and parameters from the new data source (e.g., target data source 508); in sequence 3a, the legacy data payload may be provided back to the consumer for typical purposes; in sequence 3b, both the legacy and target data payloads may be paired and sent to a message broker (i.e., Kafka; validation event topic 510); in sequence 4, the paired data may be con consumed by the data quality service 512 and business logic may perform field level comparison; in sequence 5, results of business logic may be pushed into the analytical data store 514; and in sequence 6, a reporting tool (i.e., Tableau) may expose performance of the target data source 508 for business users to decide whether to utilize the target data source 508 as the provider and terminating legacy data source 506, but the disclosure is not limited to.

For example, interactions and data exchange among the modules included in the DQVM 406 illustrated in FIG. 4 will be described in detail with reference to FIG. 5.

According to exemplary embodiments, the receiving module 414 may be configured to receive a request having configurable filters and parameters from the consumer service 502 to obtain data. The invoking module 416 may be configured to invoke, in response to receiving the request from the consumer service 502, the service API 504 for obtaining the data. According to exemplary embodiments, the fetching module 418 may be configured to fetch the requested data from the legacy data source 506 in response to calling the service API 504; and at the same time (i.e., simultaneously or in parallel process) may fetch data corresponding to the same request having the same configurable filters and parameters from the target data source 508.

According to exemplary embodiments, the comparing module 420 may be configured to compare the fetched data from the legacy data source 506 to the fetched data from the target data source 508. The score generating module 422 may be configured to generate, in response to comparing, a data quality validation score.

According to exemplary embodiments, the determining module 424 may be configured to determine whether the data quality validation score meets a predetermined/configurable threshold value. For example, when it is determined by the determining module 424 that the generated data quality validation score is equal to or more than the predetermined threshold value, the validation module 426 may validate the target data source 508 for migration readiness and terminating the legacy data source 506.

According to exemplary embodiments, during processing of the received request, an SOR payload that is returned from the legacy data source 506 as the requested data in response to calling the service API 504 may include an asynchronously fetched copy of a new utility layer's version of the payload that is returned from the target data source 508 as the fetched data corresponding to the same request having the same configurable filters and parameters in response to calling the same service API 504. According to exemplary embodiments, the pairing module 428 may be configured to pair the SOR payload and the new utility layer's version of the payload to a messaging platform topic (i.e., validation event topic 510 for consuming by a microservice (i.e., data quality service 512). The comparing module 420 may be configured to compare by utilizing the microservice, the SOR payload with the new utility layer's version of the payload; and the score generating module 422 may generate, in response to comparing, the data quality validation score.

According to exemplary embodiments, the publishing module 430 may be configured to publish, onto the GUI 438, results generated from the comparing process to a data store when it is determined that there is a discrepancy between the SOR payload and the new utility layer's version of the payload.

According to exemplary embodiments, the exposing module 432 may be configured to expose the data store (i.e., analytical datastore 514) through analytical tools for reporting and alerting on varying severities of mismatches associated with the discrepancy between the SOR payload and the new utility layer's version of the payload.

According to exemplary embodiments, the reconciling module 434 may be configured to reconcile the mismatches prior to validating that the target data source 508 is migration ready to perform as a service provider for the consumer service 502; and terminate the legacy data source 506 as the service provider.

According to exemplary embodiments, the comparing process implemented by the comparing module 420 may perform filed level comparison between the fetched data from the legacy data source 506 and the fetched data from the target data source 508.

According to exemplary embodiments, an organization may have several applications that are serving this data from the legacy data source 506 and rested services that are consuming this data and exposing it to a consumer utilizing the consumer service 502. Inside the process that exists to fetch this data, there may be a parallel process to fetch the data from a new source, i.e., the target data source 508. According to exemplary embodiments, the same request comes in and fetches a small subset of the data from the legacy data source 506, it fetches a small set of data from the new source, sends the valid source, the SOR source, to the legacy data source 506 which gets presented to the customer.

According to exemplary embodiments, the package of both data gets sent to a downstream process, where the different fields are compared to the business logic to determine whether these are accurate or whether there are any deviation in there (i.e., time stamp formatting). For example, there may be a business logic that is arbitrary to what the data is that the comparing module 420 is comparing. The comparisons are then persisted to a long-term data store that may be an analytical base for long term storage.

According to exemplary embodiments, the exposing module 432 can expose that data then through the reporting tool 516. The determining module 424 may determine by analyzing and viewing those reports and determine how accurate the reports are by comparing it to a predetermined threshold value. Scores can be generated by the score generating module 422 through the percent accuracy over time. For example, the threshold may be set by distance, i.e., once it is observed a degree of accuracy (i.e., 90%-99% accuracy, but the disclosure is not limited thereto) for predefined duration of time, the system will accept that the process is complete.

According to exemplary embodiments, the threshold may also depend on the information obtained. For example, there may be multiple system of records, i.e., debit card systems and credit card systems. For debit card systems, the DQVM 406 (may also be referred to as system) may use accuracy of 99%. For credit card system, according to exemplary embodiments, the percentage of accuracy might be different because of the way credit card payments and the associated functionalities are being processed. Based on such percentage accuracy determination, it may be determined whether to completely migrate to the new target data source 508.

According to exemplary embodiments, the reconciliation process implemented by the reconciling module 434 may include the following: obtaining data as a package, from the legacy data source 506 and the target data source 508; comparing the data from the legacy data source 506 with the data from the target data source 508 on a field level to make sure, for example, whether the payment matches, whether the merchant matches, whether the address matches, whether the phone number matches, etc. for a particular card transaction. There are multiple objects associated with the particular card transaction that have been presented by different APIs. For example, the DQVM 406 may use a different set of APIs, but ensures that a comparison is made for both of these data sources with each field to make sure the data is the same as it's supposed to be.

According to exemplary embodiments, the DQVM 406 validates the target data source 508 which started to receiving data. Once the data is persisted in the database 412, all the failures are also stored therein. The DVQM 406 may determine whether it is a field level failure, or it is a count level failure. For example, under transactions, for count level failure, if the legacy data source 506 shows 100 but the target data source shows 99, then the DVQM 406 determine that one transaction is missing and saves this failure onto the database 412 for reconciliation. The DVQM 406 may update with that level of detail and then once it is determined what the type of failure is, for example the accounts mismatching, the DVQM 406 may look and see what is going on with how the target data source 508 missed the transaction. If it is field level failure, then it is determined that the target data source 508 did not consume something properly. Then the reconciliation process starts on how to resolve those failures.

According to exemplary embodiment, the discrepancies between the old source (i.e., the legacy data source 506) and the new source (i.e., the target data source 508) are there to highlight issues with the new source. When the issues arise, reconciliation process is executed to resolve these issues.

Figure 6:
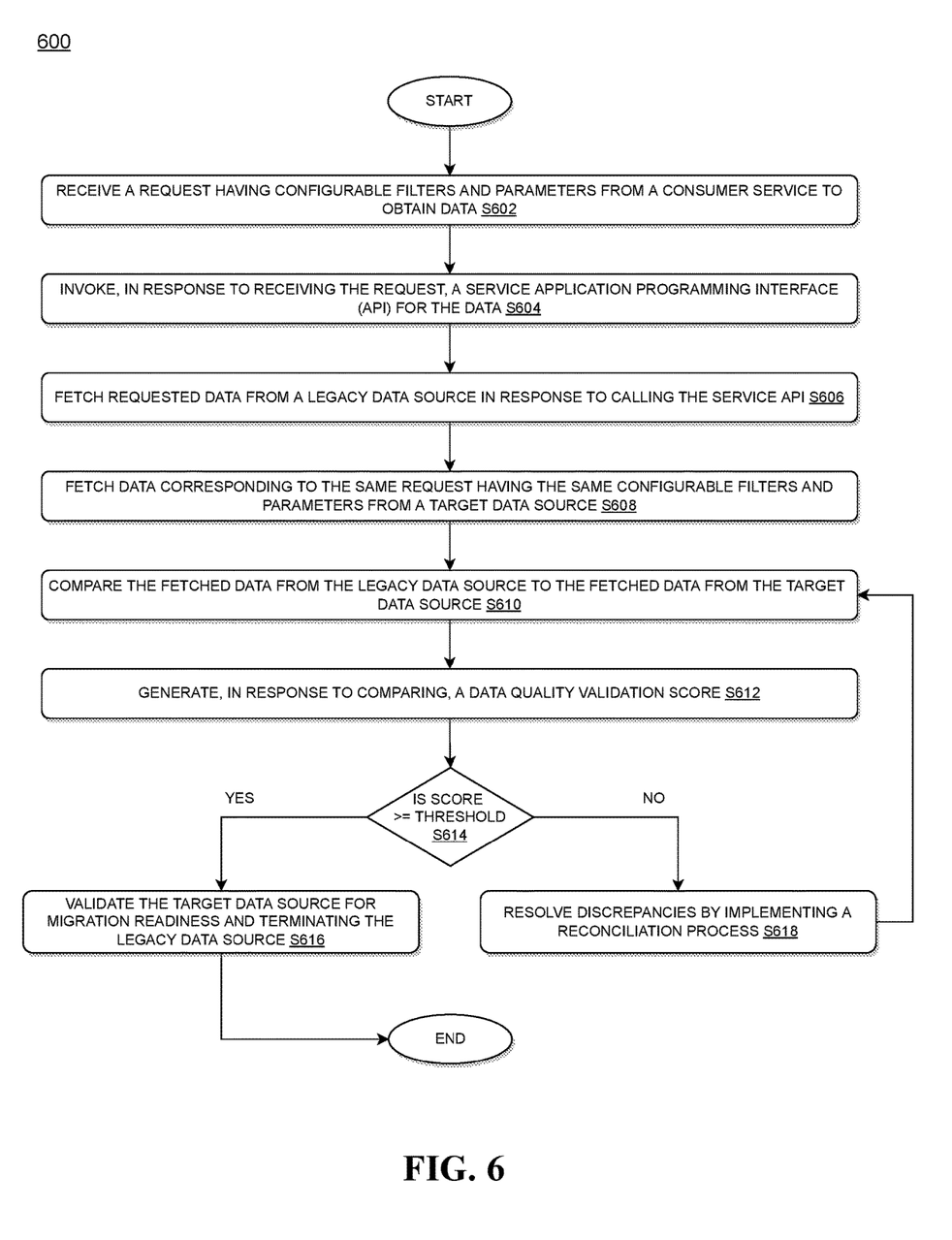
FIG. 6 illustrates a flow chart implemented by the platform and language agnostic data quality validation module of FIG. 4 for migrating servicing layer implementations with a degree of confidence in the accuracy of the data provided in accordance with an exemplary embodiment.

FIG. 6 illustrates an exemplary flow chart 600 implemented by the DQVM 406 of FIG. 4 for migrating servicing layer implementations with a degree of confidence in the accuracy of the data provided in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include receiving a request having configurable filters and parameters from a consumer service to obtain data.

At step S604, the process 600 may include invoking, in response to receiving the request, a service API for the data.

At step S606, the process 600 may include fetching requested data from a legacy data source in response to calling the service API.

At step S608, the process 600 may include fetching data corresponding to the same request having the same configurable filters and parameters from a target data source.

At step S610, the process 600 may include comparing the fetched data from the legacy data source to the fetched data from the target data source.

At step S612, the process 600 may include generating, in response to comparing, a data quality validation score.

At step S614, the process 600 may include determining whether the score is equal to or more than a predetermined/configurable threshold value.

According to exemplary embodiments, at step S616, when it is determined that the data quality validation score is equal to or more that predetermined threshold value, the process 600 may include validating the target data source for migration readiness and terminating the legacy data source.

At step S618, when it is determined that the data quality validation score is below the predetermined threshold value, the process 600 may include resolving the discrepancies by implementing a reconciliation process and the process 600 goes back to step S610.

According to exemplary embodiments, in the process 600, during processing of the received request, an SOR payload that is returned from the legacy data source as the requested data in response to calling the service API may include an asynchronously fetched copy of a new utility layer's version of the payload that is returned from the target data source as the fetched data corresponding to the same request having the same configurable filters and parameters in response to calling the same service API; and the process 600 may further include: pairing the SOR payload and the new utility layer's version of the payload to a messaging platform for consuming by a microservice; comparing, by the microservice, the SOR payload with the new utility layer's version of the payload; and generating, in response to comparing, the data quality validation score.

According to exemplary embodiments, the process 600 may further include calling a streaming queue application programming interface to compute collections of tasks and aggregate results at the stream of events and to define target latency for an end-to-end computation time per event.

According to exemplary embodiments, the process 600 may further include publishing results generated from the comparing process to a data store when it is determined that there is a discrepancy between the SOR payload and the new utility layer's version of the payload.

According to exemplary embodiments, the process 600 may further include exposing the data store through analytical tools for reporting and alerting on varying severities of mismatches associated with the discrepancy between the SOR payload and the new utility layer's version of the payload.

According to exemplary embodiments, the process 600 may further include reconciling the mismatches prior to validating that the target data source is migration ready to perform as a service provider for the consumer service; and terminating the legacy data source as the service provider.

According to exemplary embodiments, in comparing step S610, the process 600 may further include performing filed level comparison between the fetched data from the legacy data source and the fetched data from the target data source.

According to exemplary embodiments, the DQVD 402 may include a memory (e.g., a memory 106 as illustrated in FIG. 1) which may be a non-transitory computer readable medium that may be configured to store instructions for implementing a DQVM 406 for migrating servicing layer implementations with a degree of confidence in the accuracy of the data provided as disclosed herein. The DQVD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DQVM 406 or within the DQVD 402, may be used to perform one or more of the methods and processes as described herein. In a particular embodiment, the instructions may reside completely, or at least partially, within the memory 106, the medium reader 112, and/or the processor 104 (see FIG. 1) during execution by the DQVD 402.

According to exemplary embodiments, the instructions, when executed, may cause a processor 104 embedded within the DQVM 406 or the DQVD 402 to perform the following: receiving a request having configurable filters and parameters from a consumer service to obtain data; invoking, in response to receiving the request, a service application programming interface (API) for the data; fetching requested data from a legacy data source in response to calling the service API; fetching data corresponding to the same request having the same configurable filters and parameters from a target data source; comparing the fetched data from the legacy data source to the fetched data from the target data source; generating, in response to comparing, a data quality validation score; and when it is determined that the data quality validation score is equal to or more that predetermined threshold value, validating the target data source for migration readiness and terminating the legacy data source.

According to exemplary embodiments, during processing of the received request, an SOR payload that is returned from the legacy data source as the requested data in response to calling the service API may include an asynchronously fetched copy of a new utility layer's version of the payload that is returned from the target data source as the fetched data corresponding to the same request having the same configurable filters and parameters in response to calling the same service API; and the instructions, when executed, may further cause the processor 104 to perform the following: pairing the SOR payload and the new utility layer's version of the payload to a messaging platform for consuming by a microservice; comparing, by the microservice, the SOR payload with the new utility layer's version of the payload; and generating, in response to comparing, the data quality validation score.

According to exemplary embodiments, the instructions, when executed, may further cause the processor 104 to perform the following: calling a streaming queue application programming interface to compute collections of tasks and aggregate results at the stream of events and to define target latency for an end-to-end computation time per event.

According to exemplary embodiments, the instructions, when executed, may further cause the processor 104 to perform the following: publishing results generated from the comparing process to a data store when it is determined that there is a discrepancy between the SOR payload and the new utility layer's version of the payload.

According to exemplary embodiments, the instructions, when executed, may further cause the processor 104 to perform the following: exposing the data store through analytical tools for reporting and alerting on varying severities of mismatches associated with the discrepancy between the SOR payload and the new utility layer's version of the payload.

According to exemplary embodiments, the instructions, when executed, may further cause the processor 104 to perform the following: reconciling the mismatches prior to validating that the target data source is migration ready to perform as a service provider for the consumer service; and terminating the legacy data source as the service provider.

According to exemplary embodiments, in comparing process, the instructions, when executed, may further cause the processor 104 to perform the following: performing filed level comparison between the fetched data from the legacy data source and the fetched data from the target data source.

According to exemplary embodiments as disclosed above in FIGS. 1-5, technical improvements effected by the instant disclosure may include a platform for implementing a platform and language agnostic data quality validation module configured to migrate servicing layer implementations with a degree of confidence in the accuracy of the data provided, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for data quality validation by utilizing one or more processors along with allocated memory, the method comprising:
receiving a request having configurable filters and parameters from a consumer service to obtain data;
invoking, in response to receiving the request, a service application programming interface (API) for the data;
fetching requested data from a legacy data source in response to calling the service API and simultaneously fetching data corresponding to the same request having the same configurable filters and parameters from a target data source, wherein, during processing of the received request, a system of record (SOR) payload that is returned from the legacy data source as the requested data in response to calling the service API includes an asynchronously fetched copy of a new utility layer's version of the payload that is returned from the target data source as the fetched data corresponding to the same request having the same configurable filters and parameters in response to calling the same service API;
comparing the fetched data from the legacy data source to the fetched data from the target data source;
generating, in response to comparing, a data quality validation score; and
when it is determined that the data quality validation score is equal to or more that predetermined threshold value, validating the target data source for migration readiness and terminating the legacy data source.

2. The method according to claim 1, further comprising:
paring the SOR payload and the new utility layer's version of the payload to a messaging platform for consuming by a microservice;
comparing, by the microservice, the SOR payload with the new utility layer's version of the payload; and
generating, in response to comparing, the data quality validation score.

3. The method according to claim 2, further comprising:
publishing results generated from the comparing process to a data store when it is determined that there is a discrepancy between the SOR payload and the new utility layer's version of the payload.

4. The method according to claim 3, further comprising:
exposing the data store through analytical tools for reporting and alerting on varying severities of mismatches associated with the discrepancy between the SOR payload and the new utility layer's version of the payload.

5. The method according to claim 4, further comprising:
reconciling the mismatches prior to validating that the target data source is migration ready to perform as a service provider for the consumer service; and
terminating the legacy data source as the service provider.

6. The method according to claim 1, wherein comparing further comprises:
performing filed level comparison between the fetched data from the legacy data source and the fetched data from the target data source.

7. A system for data quality validation, the system comprising:
a processor; and
a memory operatively connected to the processor via a communication interface, the memory storing computer readable instructions, when executed, causes the processor to:
receive a request having configurable filters and parameters from a consumer service to obtain data;
invoke, in response to receiving the request, a service application programming interface (API) for the data;
fetch requested data from a legacy data source in response to calling the service API and simultaneously fetch data corresponding to the same request having the same configurable filters and parameters from a target data source, wherein, during processing of the received request, a system of record (SOR) payload that is returned from the legacy data source as the requested data in response to calling the service API includes an asynchronously fetched copy of a new utility layer's version of the payload that is returned from the target data source as the fetched data corresponding to the same request having the same configurable filters and parameters in response to calling the same service API;
compare the fetched data from the legacy data source to the fetched data from the target data source;
generate, in response to comparing, a data quality validation score; and
when it is determined that the data quality validation score is equal to or more that predetermined threshold value, validate the target data source for migration readiness and terminating the legacy data source.

8. The system according to claim 7, wherein the processor is further configured to:
pare the SOR payload and the new utility layer's version of the payload to a messaging platform for consuming by a microservice;
compare, by the microservice, the SOR payload with the new utility layer's version of the payload; and
generate, in response to comparing, the data quality validation score.

9. The system according to claim 8, wherein the processor is further configured to:
publish results generated from the comparing process to a data store when it is determined that there is a discrepancy between the SOR payload and the new utility layer's version of the payload.

10. The system according to claim 9, wherein the processor is further configured to:
expose the data store through analytical tools for reporting and alerting on varying severities of mismatches associated with the discrepancy between the SOR payload and the new utility layer's version of the payload.

11. The system according to claim 10, wherein the processor is further configured to:
reconcile the mismatches prior to validating that the target data source is migration ready to perform as a service provider for the consumer service; and
terminate the legacy data source as the service provider.

12. The system according to claim 7, in comparing, the processor is further configured to:
perform filed level comparison between the fetched data from the legacy data source and the fetched data from the target data source.

13. A non-transitory computer readable medium configured to store instructions for data quality validation, the instructions cause a processor to perform the following:
receiving a request having configurable filters and parameters from a consumer service to obtain data;

invoking, in response to receiving the request, a service application programming interface (API) for the data;

fetching requested data from a legacy data source in response to calling the service API and simultaneously fetching data corresponding to the same request having the same configurable filters and parameters from a target data source, wherein, during processing of the received request, a system of record (SOR) payload that is returned from the legacy data source as the requested data in response to calling the service API includes an asynchronously fetched copy of a new utility layer's version of the payload that is returned from the target data source as the fetched data corresponding to the same request having the same configurable filters and parameters in response to calling the same service API;

comparing the fetched data from the legacy data source to the fetched data from the target data source;

generating, in response to comparing, a data quality validation score; and when it is determined that the data quality validation score is equal to or more that predetermined threshold value, validating the target data source for migration readiness and terminating the legacy data source.

14. The non-transitory computer readable medium according to claim 13, wherein the instructions when executed, cause the processor to further perform the following:

paring the SOR payload and the new utility layer's version of the payload to a messaging platform for consuming by a microservice;

comparing, by the microservice, the SOR payload with the new utility layer's version of the payload; and generating, in response to comparing, the data quality validation score.

15. The non-transitory computer readable medium according to claim 14, wherein the instructions when executed, cause the processor to further perform the following:

publishing results generated from the comparing process to a data store when it is determined that there is a discrepancy between the SOR payload and the new utility layer's version of the payload.

16. The non-transitory computer readable medium according to claim 15, wherein the instructions when executed, cause the processor to further perform the following:

exposing the data store through analytical tools for reporting and alerting on varying severities of mismatches associated with the discrepancy between the SOR payload and the new utility layer's version of the payload;

reconciling the mismatches prior to validating that the target data source is migration ready to perform as a service provider for the consumer service; and terminating the legacy data source as the service provider.

17. The non-transitory computer readable medium according to claim 13, in comparing, the instructions when executed, cause the processor to further perform the following:

performing filed level comparison between the fetched data from the legacy data source and the fetched data from the target data source.

\* \* \* \* \*